Dec. 1, 1936.　　　A. R. THOMPSON　　　2,062,534
NUT CRACKING METHOD AND APPARATUS
Filed March 5, 1934　　　3 Sheets-Sheet 1

INVENTOR:
Albert R. Thompson.
BY Philip A. Minnis
ATTORNEY.

Dec. 1, 1936.     A. R. THOMPSON     2,062,534
NUT CRACKING METHOD AND APPARATUS
Filed March 5, 1934     3 Sheets-Sheet 2

INVENTOR.
Albert. R. Thompson.
BY Philip A. Minnis.
ATTORNEY.

INVENTOR.
Albert R. Thompson

Patented Dec. 1, 1936

2,062,534

UNITED STATES PATENT OFFICE 2,062,534

NUT CRACKING METHOD AND APPARATUS

Albert R. Thompson, San Jose, Calif., assignor to Food Machinery Corporation, San Jose, Calif., a corporation of Delaware Application March 5, 1934, Serial No. 713,969

6 Claims. (Cl. 146—11)

This invention relates to nut cracking apparatus, and one of its principal objects is to provide a method and an apparatus of this character which will efficiently and effectively shatter the nut shells in such manner as to release the meats or kernels therefrom in whole or unbroken halves.

Another object of the invention is to provide a continuously operable method and nut cracking machine capable of effectively operating upon nuts of a variety of sizes and shapes, and to which the nuts may be fed in indiscriminately positioned relation.

Further objects of the invention are to devise a machine for the purpose described which is simple in design and effective in operation; which has relatively large capacity; and which requires a minimum of attention or repairs.

With the foregoing objects in mind, as well as others which will hereinafter become more apparent, the invention will best be understood by the ensuing detailed description taken in connection with the accompanying drawings, wherein is illustrated a preferred embodiment.

Figure 1:
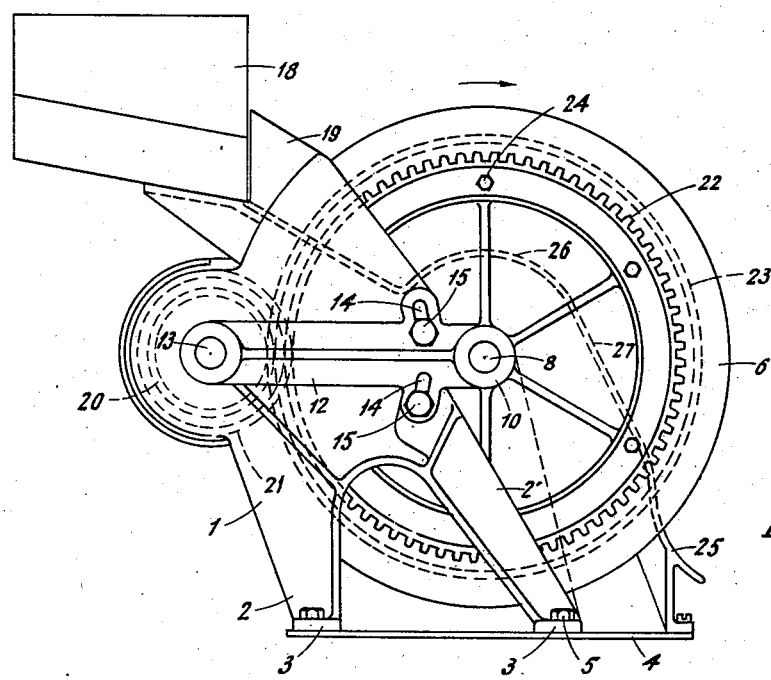
Figure 1 is a side elevation of a nut cracking machine embodying the invention.
Figure 2:
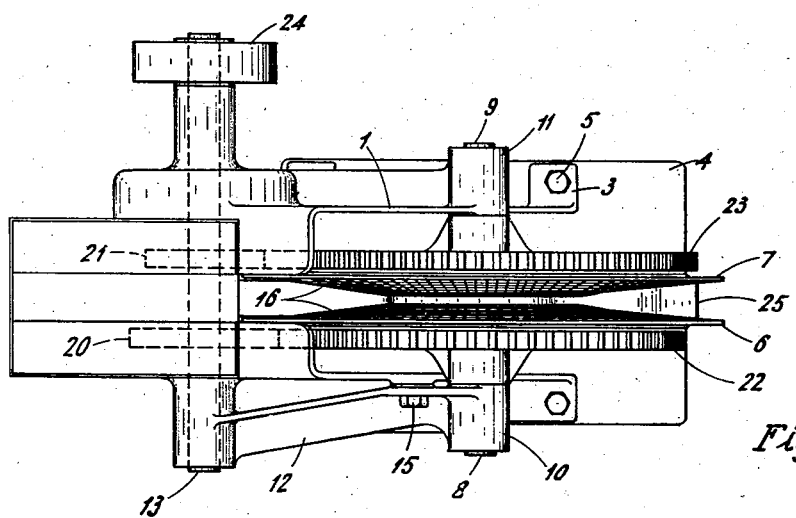
Figure 2 is a plan view of the apparatus illustrated in Figure 1.
Figure 3:
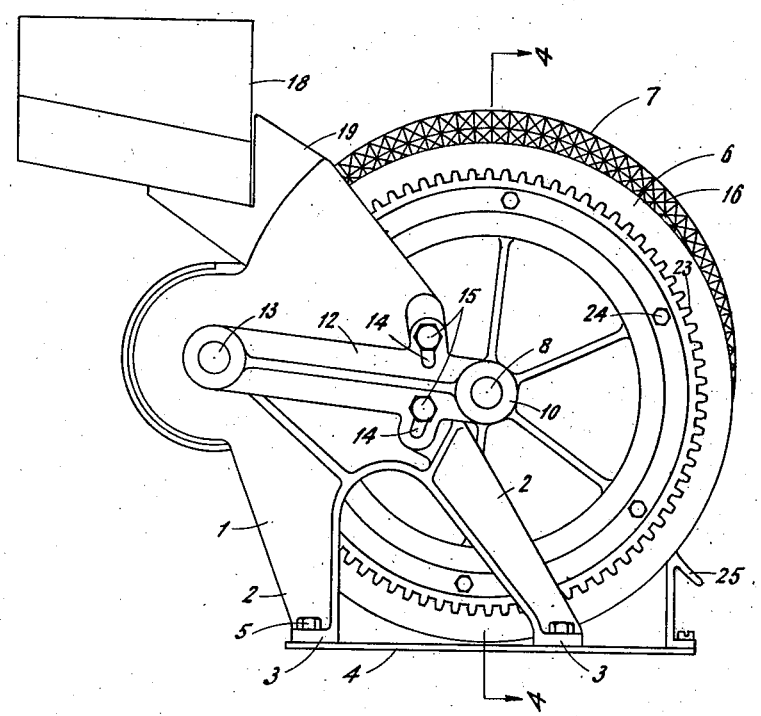
Figure 3 is a side elevation of the apparatus similar to Figure 1, but illustrating the parts in different positions.
Figure 4:
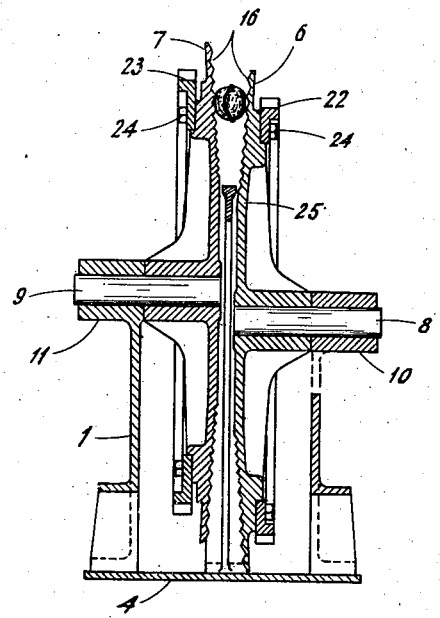
Figure 4 is a sectional view of the apparatus taken along the line 4—4 of Figure 3.

The illustrated embodiment includes a cast iron frame 1 supported by legs 2 which may be provided with flanged feet 3 so as to permit the device to be securely fastened to a base or table such as indicated at 4 as by means of bolts 5. A pair of opposed nut cracking discs 6 and 7 are secured to and carried upon horizontal shafts 8 and 9, respectively, which are in turn rotatably journalled in bearings 10 and 11. The bearing 11 is cast as an integral part of the frame 1, while bearing 10 is carried upon the free end of an adjustable arm 12 which in turn is pivotally journalled upon the drive shaft 13. The arm 12 is provided with a pair of arcuate slots 14—14 near its free end, through which extend threaded cap screws 15 which are screwed into tapped recesses in the frame 1 to secure the arm in adjusted position relative to the frame. By loosening the screws 15 the arm 12 may be adjusted up or down about the drive shaft 13 for a purpose shortly to be described, its motion being limited by the length of the slots 14. In Figures 1 and 2 the arm is shown in its uppermost position, wherein its associated disc 6 is axially aligned with the disc 7. Figures 3 and 4 illustrate the position of the parts when the arm 12 is in its lowermost position, at which time the disc 6 is eccentrically disposed with respect to disc 7.

It will be observed, as best seen in Figures 2 and 4, that the peripheral portions of the discs 6 and 7 are beveled or flared away from each other at 16 in such manner as to provide an annular wedge-shaped trough between the discs for the reception of the nuts to be cracked, which may be introduced into the trough from a receiving hopper 18 by means of an inclined chute 19.

It is essential that the nut engaging faces 16 of the discs have relative travel with respect to each other in order that nuts introduced between the faces will be rolled therebetween and cracked thereby, since if the discs were rotated in unison they would merely convey the nuts without having any cracking effect on them. Since the purpose of providing relative travel between the disc faces is to roll the nuts between them, such relative movement may be accomplished in accordance with the invention by rotating only one of the discs, but on account of the considerably increased capacity obtainable by rotating both discs, I prefer to operate them in that manner and to obtain the necessary relative movement by rotating the discs at differential speeds. This may be accomplished in various ways, but in the illustrated embodiment the discs are driven in a common direction by a pair of pinions 20 and 21 secured to the drive shaft 13 and intermeshing with ring gears 22 and 23, respectively, which are secured to the discs by cap screws 24. It will be noted that the driving ratio of the pinion and gear 20 and 22 is different from the driving ratio of the pinion and gear 21 and 23, whereby the disc 7 is driven at a somewhat slower speed than disc 6. The drive shaft 13 may be driven by a pulley 24 to which power may be supplied from any suitable source.

By the construction thus far described it will be seen that as the nuts roll down the feed chute 19 they finally become wedged between the angular faces 16 of the discs at whatever position they happen to bridge the gap by reason of their size or shape. The nuts are thereby gripped between the rotating disc faces, and because of the relative movement between the faces due to their differential speeds the nuts are forced to roll therebetween as they are carried along, with the result that because of irregularities in the shape of the nuts their shells are inevitably fractured by the pressure of the discs.

For directing cracked nuts, meats and fragments of shell from the machine to a suitable point of discharge, a guide strip 25 may be provided which, in the illustrated construction is formed by an extension of the bottom of the chute 19 and includes a curved portion 26 conforming to the curvature of the lower portion of the annular troughway between the discs, and a downwardly extending portion 27 which acts as a retriever or stripper to discharge the shells and nut meats from the machine.

I have found it desirable in some instances to arrange one of the nut cracking discs eccentrically with respect to the other, and it is for the purpose of permitting the discs to be arranged in this manner that the disc 6 is mounted upon the adjustable arm 12. The purpose in arranging the discs eccentrically is to provide a more positive rotation of the nuts on a plurality of their axes. It will be apparent that with the discs arranged coaxially, as illustrated in Figure 1, their action tends to roll the nuts about one axis only, and while it has been demonstrated in actual practice that this is ordinarily sufficient to accomplish satisfactory results, I have found that the degree of shell shatter may be increased by adjusting one of the discs eccentric to the other as illustrated in Figures 3 and 4. By this arrangement of the discs their eccentricity is such that corresponding points on the opposite nut engaging disc faces do not move in parallel paths, with the result that the nuts are given a differential rolling motion so as to positively roll them on a plurality of axes and thereby increase the degree of shell fracture. It may be stated that this advantage may be attended in some cases with a slightly increased percentage of broken kernels, and for this reason the amount of eccentricity of the discs should be selected according to the results desired.

In order to preclude the possibility of any of the nuts slipping or sliding over the faces of the discs the latter are preferably roughened so as to give them abrasive surfaces which will effectively grip the nuts. The particular examples disclosed herein will serve to illustrate two expedients which have proved satisfactory in practice, but it will be appreciated that various other ways of roughening the disc faces may be resorted to if desired with satisfactory results.

Figure 5:
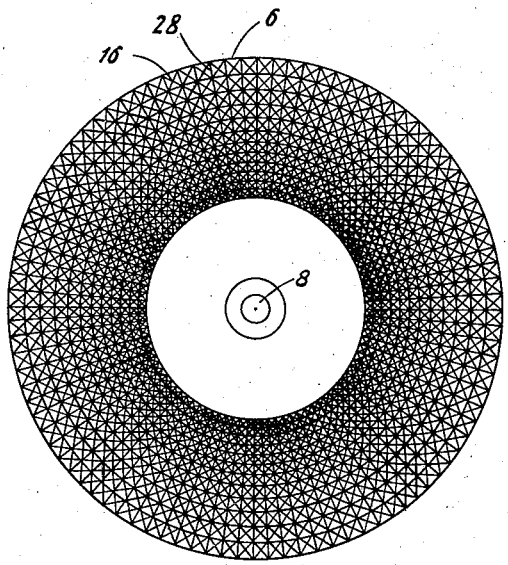
Figure 5 is an elevation of one of the discs, illustrating the knurling on the face thereof.

As shown in Figure 5, the inclined faces 16 of the discs may be knurled so as to provide a large number of spaced projecting points 28 which have been found very effective for firmly engaging the nut shells and particularly any projecting nodules or shell sutures thereon.

Figures 6, 7:
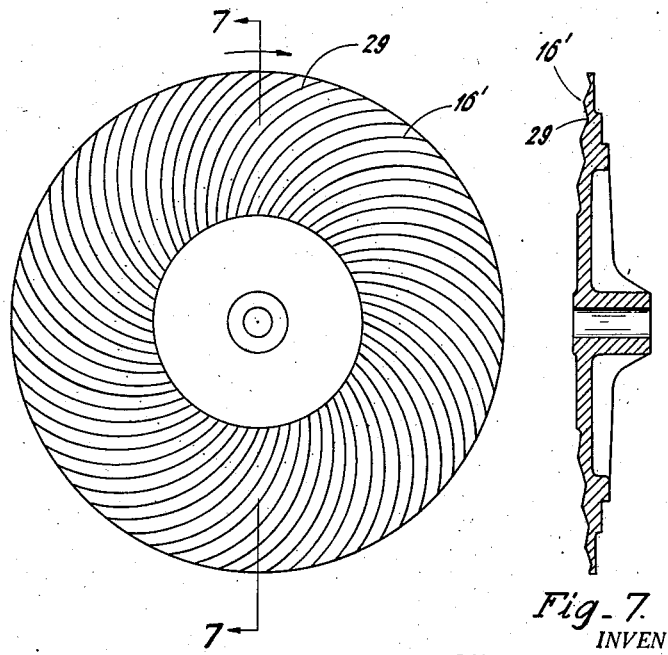
Figure 6 is an elevation of a modified form of disc, illustrating an alternative manner of roughening the nut engaging faces of the discs.
Figure 7 is a sectional view taken along the line 7—7 of Figure 6.

In Figures 6 and 7 a modified form of disc construction is illustrated in which the inclined faces 16' of the discs are provided with a series of transversely extending arcuate corrugations 29. For purposes of illustration the disc illustrated is assumed to be the faster moving disc and it will be observed that the curvature of the corrugations trends in the direction of rotation of the disc. The corrugations on the face of the complementary slower moving disc should trend in a direction opposite to its direction of rotation. It has been found that such corrugated construction not only serves to firmly engage the nuts, but the corrugations also tend to force the nuts downwardly between the angular faces of the discs so as to wedge them more firmly therebetween.

In the operation of the machine as described the nuts to be cracked are deposited in the receiving hopper 18 by any suitable means and from thence roll by gravity down the inclined feed chute 19, which introduces them between discs 6 and 7 where they become wedged between the angularly arranged disc faces 16. They are thereby grasped by the roughened surfaces of the differentially rotating discs and, as will be apparent, the faster moving disc rolls the nuts over the surface of the slower moving disc much in the same manner as one might roll a nut between his palm and any flat surface, the roughened faces of the discs serving to prevent the nut from slipping or sliding relative thereto and to insure positive rolling movement. It will be apparent that by reason of the natural irregularities in size and shape of the nuts, as they are rolled along between the relatively traveling faces of the discs they will wedge downwardly between the discs as far as their smaller dimensions will permit, whereupon as they are rolled into position with their larger dimensions cross-wise of the discs the shells will be compressed between the discs and thereby fractured. The consequent partial collapse of the shells merely serves to permit the nuts to settle further down between the disc faces, whereupon continued rolling further fractures the shells with the result that by the time the nuts have been carried around into engagement with the stripper 25, or before, the shells will have been sufficiently shattered to release or expose the nut meats.

By adjusting the discs into eccentric relation, as illustrated in Figures 3 and 4, a compound rolling motion may be imparted to the nuts so as to positively roll them about a plurality of axes, thereby more certainly insuring that the nuts will be rolled with their largest dimensions cross-wise between the disc faces and thereby be cracked.

Although for purposes of illustration I have disclosed but a single embodiment of the invention, it will be understood that various changes and modifications, which will be apparent to those skilled in the art, may be resorted to without in any way departing from the spirit of the invention or sacrificing any of its advantages, and I regard myself as being entitled to all such changes and modifications as fall within the scope of the claims hereunto appended.

Having now described my invention and in what manner the same may be used, what I claim as new and desire to secure by Letters Patent is:

1. A nut cracking machine including a pair of adjacent eccentrically disposed discs having angularly related opposed faces disposed to form an annular wedge shaped nut supporting trough therebetween, and means for providing relative rotation between said discs to cause nuts supported between their opposed faces to be rolled therebetween to fracture the nut shells.

2. A nut cracking machine including a pair of adjacent discs having angularly related opposed faces disposed to form an annular wedge shaped nut supporting trough therebetween, means for adjustably positioning one of said discs into either coaxial or eccentric relation with respect to the other, and means for providing relative rotation between said discs to cause nuts supported between their opposed faces to be rolled therebetween to fracture the nut shells.

3. A nut cracking machine including a pair of nut cracking elements having opposed endless faces angularly arranged to provide a wedge shaped nut supporting trough of constant angularity and spacing, means to effect relative bodily parallel displacement of said elements, drive means for providing differential movement of said opposed faces in the same direction and longitudinally of the trough formed thereby and at different speeds to cause nuts supported therebetween to be rolled longitudinally of the trough between the said faces to effect rolling of a nut from a position wherein a smaller diameter of the nut is engaged with said faces to a position wherein a larger diameter of the nut is engaged with said faces so that fracturing of the nut shell is accomplished by application of pressure substantially at the ends of the nut during each rolling.

4. A nut cracking machine including a pair of adjacent parallel disks having angularly related opposed faces disposed to form an annular wedge shaped nut supporting trough therebetween of constant angularity and spacing, means mounting said disks for rotation in parallel planes of movement and relative bodily parallel displacement whereby the spacing between the opposed faces at any point in said trough remains the same during rotation of said disks, and means for differentially rotating said disks in a common direction to effect rolling of a nut longitudinally of the trough from a position wherein a smaller diameter of the nut is engaged with said faces to a position wherein a larger diameter of the nut is engaged with said faces so that fracturing of the nut shell is effected by such rolling.

5. A nut cracking machine including a pair of adjacent parallel disks having angularly related opposed faces disposed to form an annular wedge shaped nut supporting trough therebetween of constant angularity and spacing, one of said faces being provided with transversely extending arcuate ridges arranged to urge the nuts inwardly between the disks, separate means mounting said disks for rotation in parallel planes of movement and relative bodily parallel displacement whereby the spacing between the opposed faces at any point in said trough remains the same during rotation of said disks, and means for differentially rotating said disks in a common direction to effect rolling of a nut longitudinally of the trough from a position wherein a smaller diameter of the nut is engaged with said faces to a position wherein a larger diameter of the nut is engaged with said faces so that fracturing of the nut shell is effected by such rolling.

6. The method of cracking irregular shaped nuts comprising the steps of establishing a wedge shaped nut supporting trough between adjacent faces of a pair of nut cracking elements, delivering nuts to be cracked into said trough, and differentially driving said cracking elements in parallel directions to effect rolling of the nuts longitudinally of the trough whereby the nut shells are fractured by the confining action of said cracking elements on the nuts as the latter are rolled to bring their long diameters crosswise of the trough.

ALBERT R. THOMPSON.